US012328801B2

(12) United States Patent
Kim et al.

(10) Patent No.: US 12,328,801 B2
(45) Date of Patent: Jun. 10, 2025

(54) LED CONTROL SYSTEM AND DRIVER, DATA TRANSMISSION METHOD, ELECTRONIC DEVICE, CONTROLLER AND STORAGE MEDIUM

(71) Applicant: Beijing Xianxin Technology Co., Ltd., Beijing (CN)

(72) Inventors: Jong Dae Kim, Beijing (CN); Youngjin Lim, Beijing (CN); Chenghui Yan, Beijing (CN)

(73) Assignee: Beijing Xianxin Technology Co., Ltd., Beijing (CN)

( * ) Notice: Subject to any disclaimer, the term of this patent is extended or adjusted under 35 U.S.C. 154(b) by 272 days.

(21) Appl. No.: 18/094,336

(22) Filed: Jan. 6, 2025

(65) Prior Publication Data

US 2023/0142268 A1 May 11, 2023

Related U.S. Application Data

(63) Continuation of application No. PCT/CN2020/112821, filed on Sep. 1, 2020.

(30) Foreign Application Priority Data

Jul. 10, 2020 (CN) ......................... 202010659935.6

(51) Int. Cl.

*H05B 45/10* (2020.01)
*G09G 3/34* (2006.01)
*H05B 47/18* (2020.01)

(52) U.S. Cl.

CPC ........... *H05B 45/10* (2020.01); *G09G 3/3406* (2013.01); *H05B 47/18* (2020.01); *G09G 2320/0626* (2013.01)

(58) Field of Classification Search

CPC ... G09G 3/2092–22; G09G 3/30–3426; G09G 5/003–008;

(Continued)

(56) References Cited

U.S. PATENT DOCUMENTS 5,737,633 A * 4/1998 Suzuki ................ G06F 13/4286 713/502
2003/0057886 A1* 3/2003 Lys ....................... F21V 21/002 315/324

(Continued)

FOREIGN PATENT DOCUMENTS

CN 1519811 A 8/2004
CN 101783116 A 7/2010

(Continued)

OTHER PUBLICATIONS

International Search Report of PCT/CN2020/112821.

(Continued)

*Primary Examiner* — Keith L Crawley
(74) *Attorney, Agent, or Firm* — J.C. PATENTS

(57) ABSTRACT

Provided are an LED control system, a device, a method and a storage medium. The system includes: a controller and a plurality of cascaded LED drivers, where the controller is configured to: send a data signal to the plurality of cascaded LED drivers, the data signal includes data packets corresponding to the plurality of LED drivers arranged in sequence, and each LED driver corresponds to a data packet that includes control data and an end bit corresponding to the LED driver. The LED driver is configured to: acquire control data of a preset length from the controller or a previous LED driver, and detect whether the end bit is a preset value; if the end bit is the preset value and there is a next LED driver, transmit a data signal after the end bit to the next driver.

20 Claims, 5 Drawing Sheets

(58) Field of Classification Search
CPC .......................... G09G 2310/0237–024; G09G 2320/062–0653; G09G 2370/04–10; H05B 45/10; H05B 47/18; H05B 47/198–1995; G02F 1/133603; G02F 1/133612
See application file for complete search history.

(56) References Cited

U.S. PATENT DOCUMENTS

2005/0012705 A1* 1/2005 Akahori ................. G09G 5/006 345/99
2006/0242501 A1* 10/2006 Kimelman ..... G01R 31/318572 714/724
2009/0284445 A1 11/2009 Kuo
2010/0102734 A1* 4/2010 Quick .................. H05B 47/155 315/312
2010/0257303 A1* 10/2010 Lee ..................... G06F 13/4252 710/316
2012/0139823 A1* 6/2012 Fujiwara .............. G09G 3/3426 345/102
2012/0207155 A1* 8/2012 Nelogal .................. H04L 69/22 370/389

FOREIGN PATENT DOCUMENTS

| | | | |
|---|---|---|---|
| CN | 101896895 | A | 11/2010 |
| CN | 101916543 | A | 12/2010 |
| CN | 102129838 | A | 7/2011 |
| CN | 102472906 | A | 5/2012 |
| CN | 104517569 | A | 4/2015 |
| CN | 105246186 | A | 1/2016 |
| CN | 107068072 | A | 8/2017 |
| CN | 111540318 | A | 8/2020 |
| JP | 2009294282 | A | 12/2009 |

OTHER PUBLICATIONS

Notification to Grant Patent Right for the priority application CN202010659935.6.
First Office Action of the priority application CN202010659935.6.

* cited by examiner

LED CONTROL SYSTEM AND DRIVER, DATA TRANSMISSION METHOD, ELECTRONIC DEVICE, CONTROLLER AND STORAGE MEDIUM

CROSS-REFERENCE TO RELATED APPLICATIONS

This application is a continuation of International Application No. PCT/CN2020/112821 filed on Sep. 1, 2020, which claims priority to Chinese Patent Application No. 202010659935.6, filed on Jul. 10, 2020, both of which are hereby incorporated by reference in their entireties.

TECHNICAL FIELD

Embodiments of the present disclosure relate to the field of LED display, and in particular to an LED control system, a device, a method and a storage medium.

BACKGROUND

With the continuous development of electronic technology, an image display device such as a liquid crystal television (LCD TV) is continuously enhanced in performance, and its applications have become more and more extensive.

Currently, a light emitting diode (LED) is often used in a liquid crystal television to enhance a display effect. For example, an LED backlight method can be used to improve the color performance of the LCD TV for display by arranging hundreds or even thousands of LEDs. In the prior art, in order to realize the control of LEDs, a plurality of LED drivers need to be provided. A controller is connected to the LED drivers respectively, and transmits corresponding data to the LED drivers.

A disadvantage of the prior art is that in order to realize 1: N communication between the controller and the LED drivers, it is necessary to set addresses of N LED drivers in advance. The steps are cumbersome, the controller and the N LED drivers are connected separately, and the wiring is complex and the cost is high.

SUMMARY

Embodiments of the present disclosure provide an LED control system, a device, a method and a storage medium, so as to solve the technical problem of complex wiring and high cost between a controller and LED drivers in the prior art.

In a first aspect, an embodiment of the present disclosure provides an LED control system, including: a controller and a plurality of cascaded LED drivers;

the controller is configured to: send a data signal to the plurality of cascaded LED drivers, where the data signal includes data packets corresponding to the plurality of LED drivers arranged in sequence, and each LED driver corresponds to a data packet that includes control data and an end bit corresponding to the LED driver;

the LED driver includes a bypass switch; the LED driver is configured to: acquire control data of a preset length from the controller or a previous LED driver, and detect whether the end bit is a preset value; if it is detected that the end bit is the preset value and there is a next LED driver, set a bypass flag to a first state value; where when the bypass flag is the first state value, the bypass switch is turned on to transmit a data signal after the end bit to the next driver; when the bypass flag is not the first state value, the bypass switch is turned off.

In one possible design, any two adjacent LED drivers are connected through a single signal line, and a first LED driver of the plurality of cascaded LED drivers is connected with the controller.

In one possible design, the LED driver is further configured to:

store the acquired control data;

after the control data of the preset length is acquired, set a data received flag to a second state value to prevent data after the control data of the preset length from being stored.

In one possible design, each LED driver corresponds to a data packet that further includes a preamble code field located before the control data;

when storing the acquired control data, the LED driver is specifically configured to: detect whether the preamble code field is correct; if the preamble code field is correct, store control data after the preamble code field; if the preamble code field is incorrect, discard the control data after the preamble code field.

In one possible design, the LED driver is configured to:

if the preamble code field is incorrect, and/or data is not received within a preset time, initialize the LED driver.

In one possible design, each LED driver is connected with at least one LED;

the control data is brightness data used for the LED driver to control brightness of an LED connected thereto;

or, the control data is command data used for controlling a state of the LED driver.

In one possible design, the data packet further includes: an indicator bit set before the control data;

the indicator bit is used to indicate whether the control data is brightness data or command data.

In one possible design, the command data includes at least one of the following:

a reset command used for setting the bypass flag of each LED driver to the first state value;

a start command used for setting the bypass flag of each LED driver to a value other than the first state value;

a display command used for controlling each LED driver to drive, according to corresponding brightness data, the LED to operate;

a watchdog control command used for controlling a watchdog of each LED driver.

In one possible design, the controller is further configured to: send the reset command and then the start command before sending the brightness data.

In a second aspect, an embodiment of the present disclosure provides an electronic device, including the LED control system described in any item of the first aspect and a plurality of LEDs;

where the LED control system is configured to control the plurality of LEDs.

In a third aspect, an embodiment of the present disclosure provides a data transmission method applied to any LED driver of a plurality of cascaded LED drivers, where the LED driver includes a bypass switch, and the method includes:

acquiring a data signal from a controller or a previous LED driver, where the data signal includes data packets corresponding to the plurality of LED drivers arranged in sequence, and each LED driver corresponds to a data packet that includes control data and an end bit corresponding to the LED driver;

after control data of a preset length is acquired, detecting whether the end bit is a preset value;

if the end bit is the preset value and there is a next LED driver, setting a bypass flag to a first state value; where when the bypass flag is the first state value, the bypass switch is turned on to transmit a data signal after the end bit to the next driver; when the bypass flag is not the first state value, the bypass switch is turned off.

In a fourth aspect, an embodiment of the present disclosure provides a data transmission method applied to a controller. The method includes:

determining a data signal corresponding to a plurality of cascaded LED drivers, where the data signal includes data packets corresponding to the plurality of LED drivers arranged in sequence, and each LED driver corresponds to a data packet that includes control data and an end bit corresponding to the LED driver;

sending the data signal to the plurality of cascaded LED drivers, to enable the LED driver to acquire control data of a preset length from the controller or a previous LED driver, and detecting whether the end bit is a preset value; if it is detected that the end bit is the preset value and there is a next LED driver, setting a bypass flag to a first state value; where when the bypass flag is the first state value, the bypass switch of the LED driver is turned on to transmit a data signal after the end bit to the next driver; when the bypass flag is not the first state value, the bypass switch is turned off.

In a fifth aspect, an embodiment of the present disclosure provides an LED driver, including at least one processor and a memory;

where the memory has computer-executable instructions stored therein;

the at least one processor executes the computer-executable instructions stored in the memory, to enable the at least one processor to execute the method as described in the third aspect.

In a sixth aspect, an embodiment of the present disclosure provides a controller, including at least one processor and a memory;

where the memory has computer-executable instructions stored therein;

the at least one processor executes the computer-executable instructions stored in the memory, to enable the at least one processor to execute the method as described in the fourth aspect.

In a seventh aspect, an embodiment of the present disclosure provides a computer-readable storage medium in which computer-executable instructions are stored, where when a processor executes the computer-executable instructions, the method described in the third aspect or the fourth aspect is implemented.

According to the LED control system, the device, the method and the storage medium provided by the embodiments of the present disclosure, a data signal can be sent to a plurality of cascaded LED drivers by a controller, the data signal includes data packets corresponding to the plurality of LED drivers arranged in sequence, and each LED driver corresponds to a data packet that includes control data and an end bit corresponding to the LED driver, the LED driver is configured to: acquire control data of a preset length from the controller or a previous LED driver, and detect whether the end bit is a preset value; if it is detected that the end bit is the preset value and there is a next LED driver, set a bypass flag to a first state value; where when the bypass flag is the first state value, the bypass switch of the LED driver is turned on, to transmit a data signal after the end bit to the next driver; when the bypass flag is not the first state value, the bypass switch is turned off. Therefore, data transmission can be realized by means of cascading without setting addresses of LED drivers in advance. The steps are simple, the efficiency and accuracy are high, the wiring is simplified, and the cost is effectively reduced.

BRIEF DESCRIPTION OF DRAWINGS

In order to illustrate technical solutions in embodiments of the present disclosure or the prior art more clearly, accompanying drawings that need to be used in description of the embodiments or the related art will be briefly introduced below. It is obvious that the accompanying drawings in the following description are intended for some embodiments of the present disclosure, and for those of ordinary skill in the art, other accompanying drawings may also be acquired according to these accompanying drawings without any creative effort.

DESCRIPTION OF EMBODIMENTS

In order to make objectives, technical solutions and advantages of embodiments of the present disclosure clearer, the technical solutions in the embodiments of the present disclosure will be described clearly and completely in conjunction with the accompanying drawings in the embodiments of the present disclosure. Obviously, the described embodiments are a part of the embodiments of the present disclosure, not all of the embodiments of the present disclosure. Based on the embodiments in the present disclosure, all other embodiments obtained by those of ordinary skill in the field without any creative effort should fall within the protection scope of the present disclosure.

The terms used in the embodiments of the present disclosure are only for the purpose of describing specific embodiments, and are not intended to limit the present disclosure. The singular forms “a” and “the” used in the embodiments of the present disclosure are also intended to include plural forms, unless the context clearly indicates other meanings.

It should be understood that the term "and/or" used herein is only an association relationship describing associated objects, which means that there may be three relationships, for example, A and/or B may mean that A exists alone, and A and B exist simultaneously, B exists alone. In addition, the character "/" herein generally indicates that the contextual objects are in an "or" relationship.

Depending on the context, the words "if", "in case" as used herein may be interpreted as "at" or "when" or "in response to determining" or "in response to detecting". Similarly, depending on the context, the phrases "if it is determined that" or "if it is detected that (stated condition or event)" could be interpreted as "when determining" or "in response to determining" or "when detecting that (stated condition or event)" or "in response to detecting that (stated condition or event)".

It should also be noted that the terms "including", "containing" or any other variation thereof is intended to cover a non-exclusive inclusion, such that a commodity or system including a series of elements includes not only those elements but also includes other elements not explicitly listed, or also includes elements inherent to such commodity or system. Without further limitations, an element defined by a phrase "including a . . . " does not exclude the presence of additional identical elements in the commodity or system including the element.

Figure 1:
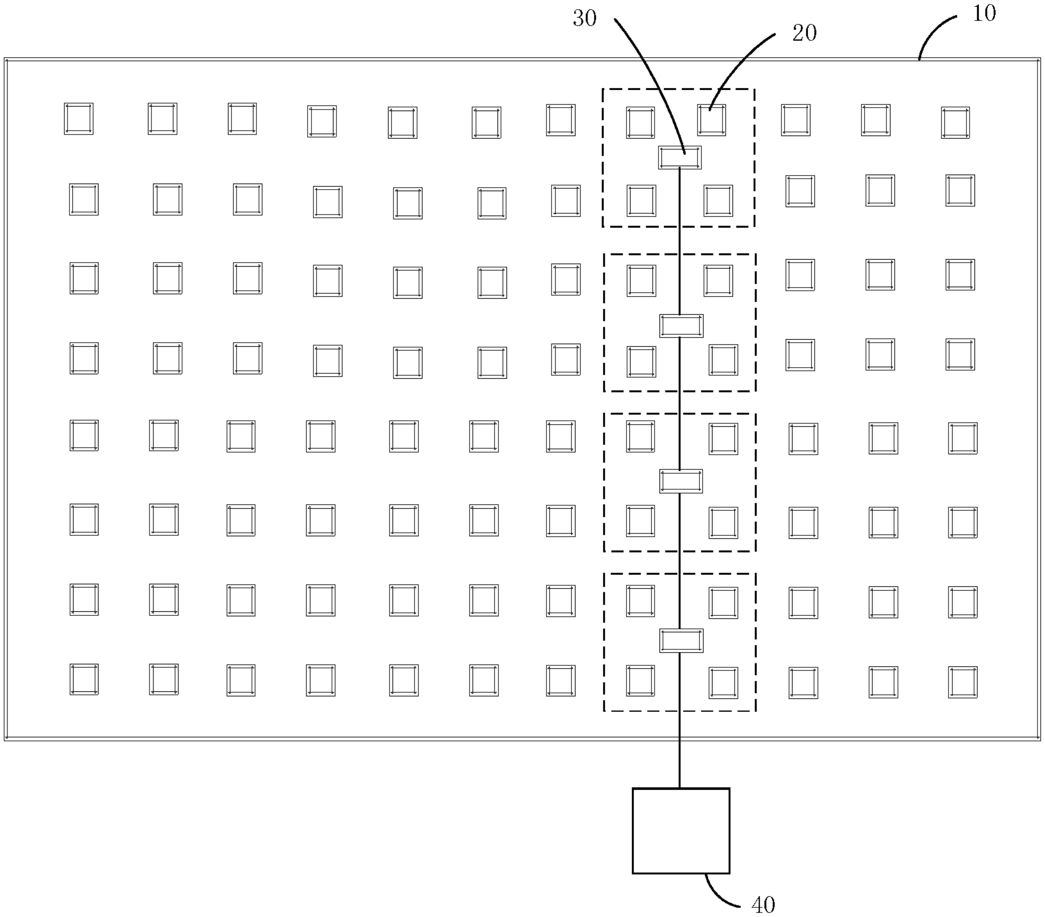
FIG. 1 is a schematic diagram of an application scenario of an LED control system according to an embodiment of the present disclosure.

FIG. 1 is a schematic diagram of an application scenario of an LED control system according to an embodiment of the present disclosure. As shown in FIG. 1, a plurality of LEDs 20 are arranged on a substrate 10, and the LEDs 20 are controlled by a LED driver 30. Each square on the substrate 10 in the figure represents an LED 20, and a rectangle represents an LED driver 30. For ease of view, only part of the LED drivers 30 are shown in the figure.

Each LED driver 30 can control one or more LEDs 20. FIG. 1 shows, in a form of dotted box, a specific solution of an LED driver 30 controlling LEDs 20. For each LED driver 30, it can be connected with four LEDs 20 around, that is, connected respectively with the four LEDs 20 within the dotted box where the LED driver 30 is located, and control the brightness of the four connected LEDs 20.

In an embodiment of the present disclosure, a plurality of LED drivers 30 can be in a cascade state, and a data signal sent by a controller 40 is sequentially transferred among LED drivers 30. By setting end bits in the data signal, each LED driver 30 can determine whether its own signal has been received normally, so as to improve the accuracy of data transmission and meet requirements for data transmission in the cascade state.

Figure 2:
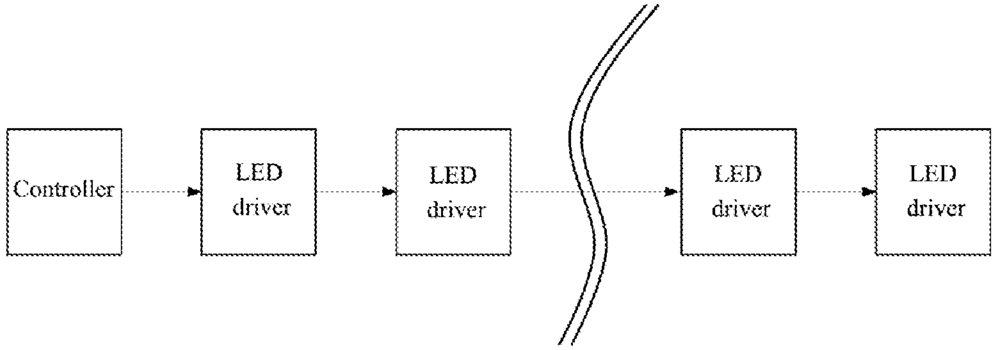
FIG. 2 is a schematic structural diagram of an LED control system according to an embodiment of the present disclosure.

FIG. 2 is a schematic structural diagram of an LED control system according to an embodiment of the present disclosure. As shown in FIG. 2, the LED control system may include: a controller and a plurality of cascaded LED drivers. The controller can be used as a primary device, and the LED drivers can be used as secondary devices, and the controller controls the LED drivers.

In an embodiment, any two adjacent LED drivers may be connected through a single signal line, and a first LED driver of the plurality of cascaded LED drivers is connected with the controller.

As shown in FIG. 2, the plurality of LED drivers are connected in series. The first LED driver is connected to the controller. The output of the controller is used as the input of the first LED driver, and the input of each LED driver thereafter is the output of the previous LED driver.

The controller is configured to: send a data signal to the plurality of cascaded LED drivers, where the data signal includes data packets corresponding to the plurality of LED drivers arranged in sequence, and each LED driver corresponds to a data packet that includes control data and an end bit corresponding to the LED driver.

The LED driver includes a bypass switch; the LED driver is configured to: acquire control data of a preset length from the controller or a previous LED driver, and detect whether the end bit is a preset value; if it is detected that the end bit is the preset value and there is a next LED driver, set a bypass flag (Bypass flag) to a first state value; where when the bypass flag is the first state value, the bypass switch is turned on to transmit a data signal after the end bit to the next driver; when the bypass flag is not the first state value, the bypass switch is turned off.

Specifically, the controller is configured to send a data signal. The data signal can include data packets corresponding to the plurality of LED drivers. In the data signal, an arrangement order of the data packets is consistent with a cascade order of the LED drivers. That is to say, in the data signal, an $i^{th}$ data packet is a data packet corresponding to an $i^{th}$ LED driver, where i takes a value between 0 and N, and N is the number of the LED drivers.

Each LED driver is configured to acquire its own corresponding data packet and perform a corresponding operation according to the corresponding data packet. Each data packet may include control data and an end bit. The control data can be of a preset length, and the control data can be set before the end bit. The end bit must be a preset value so as to continue to transfer a data signal downward.

For the convenience of description, in embodiments of the present disclosure, description is made by taking an example where each LED driver corresponds to control data having a length of 4 and the preset value is 0.

After acquiring 4-bit control data, each LED driver may detect whether a $5^{th}$ bit of data, that is, the end bit, is 0. If it is 0, a data signal after the end bit will be transferred to the next LED driver. If it is not 0, the data signal after the end bit cannot be transferred downward.

Figure 3:
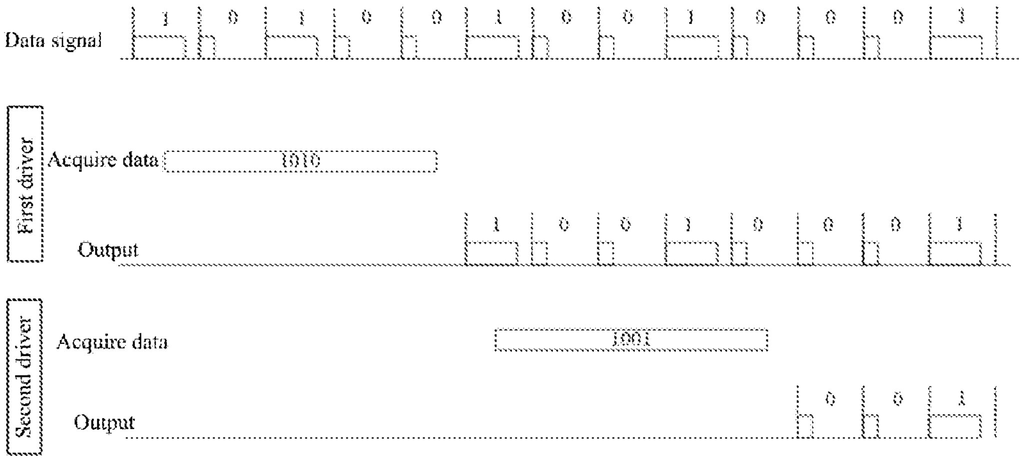
FIG. 3 is a schematic diagram of a data signal transmission process according to an embodiment of the present disclosure.

FIG. 3 is a schematic diagram of a data signal transmission process according to an embodiment of the present disclosure. As shown in FIG. 3, a data signal sent by a controller may be 1010 0 1001 0 001 . . . . A first LED driver collects 4-bit control data as 1010, and then detects that the $5^{th}$ bit, that is, the end bit, is 0, with satisfaction of the requirement, subsequent data can be transferred downward to a second LED driver. Therefore, the output signal of the first LED driver is 1001 0 001.

After the second LED driver collects 4-bit control data as 1001, it detects that the $5^{th}$ bit, that is, the end bit, is 0, with satisfaction of the requirement, subsequent data can be transferred downward to a third LED driver. Therefore, the output signal of the second LED driver is 001 . . . . By that analogy, until the data is transmitted to a last LED driver, the configuration of all LED drivers can be completed.

In this embodiment, when the LED driver detects that the end bit is a preset value, a bypass flag can be set to a first state value, so as to transmit a data signal after the end bit to a next LED driver. When the bypass flag is the first state value, the LED driver controls the bypass switch to be turned on so as to transmit data to the next LED driver; when the bypass flag is not the first state value, the LED driver controls the bypass switch to be turned off so as not to transfer data backward.

Working principles and processes of embodiments of the present disclosure are described above through specific examples. Those skilled in the art can understand that: the above example can be adjusted according to actual needs, for example, the end bit can be set to 1 to represent that the data is correct, or, two adjacent LED drivers can be set to connect through two or more data lines to transmit more data at a time, thereby improving data transmission efficiency.

The LED control system provided by this embodiment includes a controller and a plurality of cascaded LED drivers. The controller is configured to send a data signal to the plurality of cascaded LED drivers, where the data signal includes data packets corresponding to the plurality of LED drivers arranged in sequence, and each LED driver corresponds to a data packet that includes control data and an end bit corresponding to the LED driver. The LED driver is configured to: acquire control data of a preset length from the controller or a previous LED driver, and detect whether the end bit is a preset value; if it is detected that the end bit is the preset value and there is a next LED driver, set a bypass flag to a first state value; where when the bypass flag is the first state value, the bypass switch of the LED driver is turned on, so as to transmit a data signal after the end bit to the next driver; when the bypass flag is not the first state value, the bypass switch is turned off, so that data transmission can be realized by means of cascading without setting addresses of the LED drivers in advance. The steps are simple, the efficiency and accuracy are high, the wiring is simplified, and the cost is effectively reduced.

In an embodiment, the LED driver is further configured to: store the acquired control data; after the control data of the preset length is acquired, set a data received flag to a second state value to prevent data after the control data of the preset length from being stored.

In order to better understand the solutions of the embodiments of the present disclosure, a process of data signal collection will be described hereunder firstly.

Figure 4:
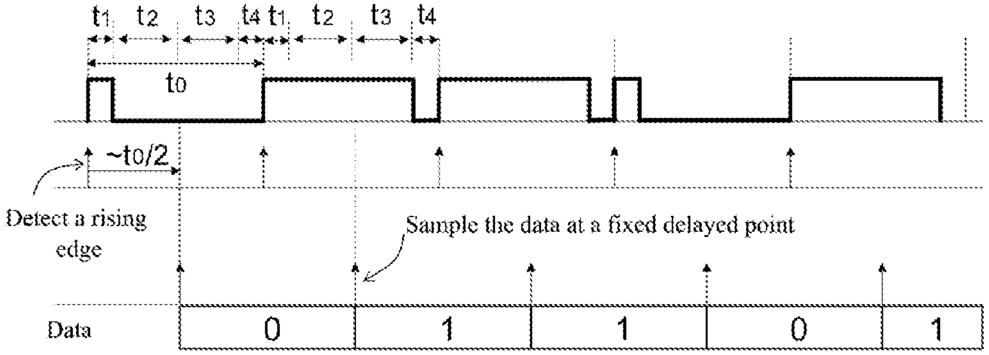
FIG. 4 is a schematic diagram of a principle of data signal collection according to an embodiment of the present disclosure.

FIG. 4 is a schematic diagram of a principle of data signal collection according to an embodiment of the present disclosure. As shown in FIG. 4, the transmission of one-bit data can occupy t0 time, and t0 can be divided into four periods: t1, t2, t3, and t4. The t1 period is at a high level, the t4 period is at a low level, and the t2 and t3 periods are used to transmit data. If the t2 and t3 periods are at a high level, the transmitted data is 1; if the t2 and t3 periods are at a low level, the transmitted data is 0. Table 1 shows an example of a duration corresponding to each time period.

TABLE 1

| Period | Name | Duration |
|---|---|---|
| t0 | 1 bit period | 6 μsec |
| t1 | Pre time/Clock edge | 1 μsec |
| t2 | Setup time for data | 2 μsec |
| t3 | Hold time for data | 2 μsec |
| t4 | Post time/Return edge | 1 μsec |

As shown in FIG. 4 and Table 1, the LED driver can detect a rising edge at the beginning of t1, and then sample the data at a fixed delayed point (Sample the data at fixed delayed point) after t0/2, that is, 3 microseconds (μsec), to determine whether current data is 0 or 1.

Upward arrows in FIG. 4 represent the time to detect the rising edge or to sample the data. It can be seen from FIG. 4 that the potentials in t2 and t3 periods are consistent, and sampling between t2 and t3 can effectively ensure correctness of the sampled data. Data transmission between a controller and LED drivers and between adjacent LED drivers can be realized through the solution shown in FIG. 4.

Figure 5:
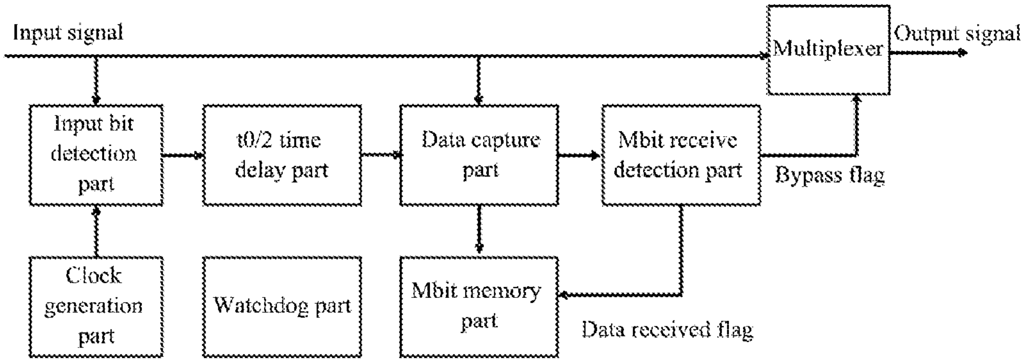
FIG. 5 is a schematic diagram of a working principle of an LED driver according to an embodiment of the present disclosure.

FIG. 5 is a schematic diagram of a working principle of an LED driver according to an embodiment of the present disclosure. As shown in FIG. 5, the LED driver may include:

- an input bit detection part, configured to detect a rising edge of an input signal;
- a clock generation part, configured to generate a clock signal, so as to realize a detection of the input signal through the clock signal;
- a watchdog part;
- a t0/2 time delay part, configured to delay time of t0/2;
- a data capture part, configured to capture data at t0/2 and determine whether data transmitted is 1 or 0;
- an Mbit memory part, configured to store control data with a preset length of M bits;
- an Mbit receive detection part, configured to judge whether received data reaches Mbit, and set a data received flag to a second state value after the Mbit is reached, so as to control the Mbit memory part not to continue storing subsequent data; in addition, the Mbit receive detection part may further judge whether an $(M+1)^{th}$ bit is 0 after determining that the received data reaches the Mbit, if so, set a bypass flag to a first state value, for example, 1;
- a multiplexer (MUX), configured to not transfer data backward when the bypass flag is 0, and to transfer data backward when the bypass flag is 1. The MUX can be used here as a bypass switch to control whether the data should be transferred backward.

Figure 6:
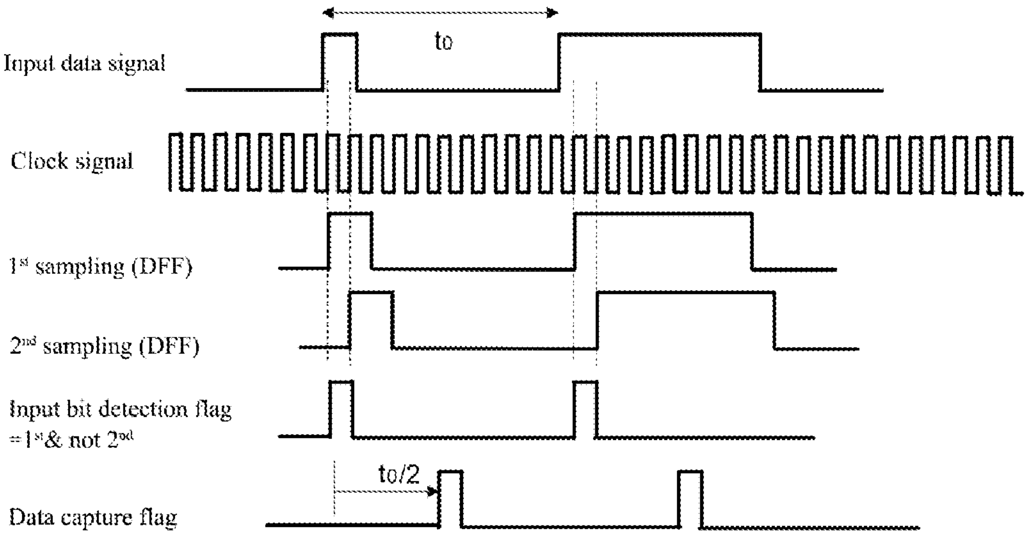
FIG. 6 is a working sequence diagram of an LED driver according to an embodiment of the present disclosure.

FIG. 6 is a working sequence diagram of an LED driver according to an embodiment of the present disclosure. As shown in FIG. 6, each bit of data in the input signal occupies t0 time, and a rising edge equivalent to the start of data is detected on the input signal line. Specifically, two DFFs (Data Flip-Flop/Delay Flip-Flop, D Flip-Flop) can be used for detection. The clock signal generated by the clock generation part is faster than a speed of sampling t1 at least twice.

An input bit detection flag, is equal to an AND (logical product) result between a first sampling result and a NOT value (logical negation) of a second sampling result, that is, the input bit detection flag=$1^{st}$ & not $2^{nd}$. Therefore, only when a first sampling is at a high level and a second sampling is at a low level, the input bit detection flag is 1.

After the input bit detection flag becomes 1, delay t0/2, and a data capture flag becomes 1 to capture the input signal. The captured data is sequentially stored in the Mbit Memory part.

After the Mbit is captured, change the data received flag to prevent further storage. Change the bypass flag to 1 at an $(M+1)^{th}$ bit, so that the multiplexer transfers the data signal backward. The $(M+1)^{th}$ bit must be 0.

Figure 7:
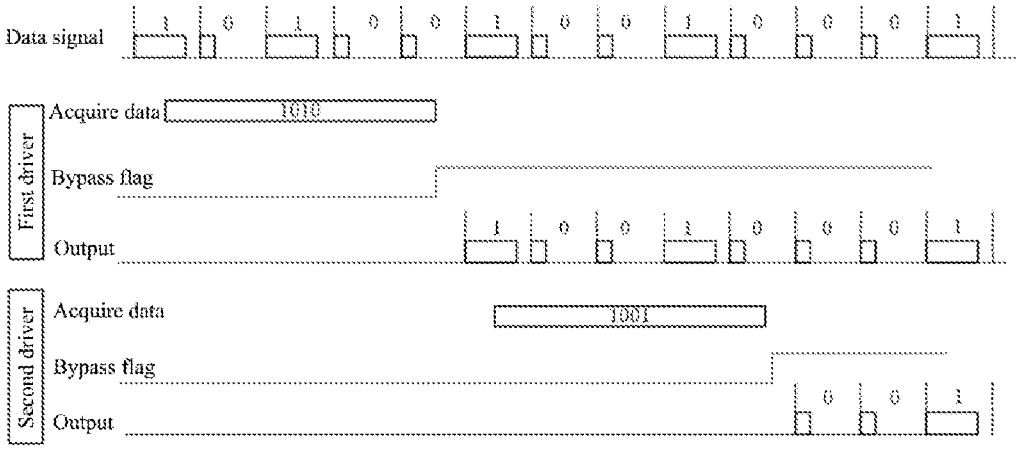
FIG. 7 is a schematic diagram of a bypass flag change during a data signal transmission process according to an embodiment of the present disclosure.

FIG. 7 is a schematic diagram of a bypass flag change during a data signal transmission process according to an embodiment of the present disclosure. FIG. 7 is based on FIG. 3 with an addition of a bypass flag change. As shown in FIG. 7, a data signal sent by a controller may be 1010 0 1001 0 001 . . . , and each bit of data can be transmitted as shown in FIG. 3. A first LED driver collects 4-bit control data as 1010, and then detects that the $5^{th}$ bit, that is, the end bit, is 0, with satisfaction of the requirement, the bypass flag can be raised to 1, so that the subsequent data can be transferred downward. Therefore, the output signal of the first LED driver is 1001 0 001 . . . .

After a second LED driver collects 4-bit control data as 1001, it detects that the $5^{th}$ bit, that is, the end bit, is 0, with satisfaction of the requirement, the bypass flag can be raised to 1, so that subsequent data can be transferred downward to a third LED driver. Therefore, the output signal of the second LED driver is 001 . . . . By that analogy, until the data is transmitted to a last LED driver, the configuration of all LED drivers can be completed.

With the solution shown above, a data transmission process can be controlled by each flag. Specifically, the bypass flag can control whether the data signal should be transmitted backward, effectively preventing occurrence of errors in the transmission process, and improving the accuracy and efficiency of transmission. The transfer of data backward is realized by controlling a bypass switch, such as a multiplexer, through a bypass flag, and the structure is simple and easy to implement. After the control data of the preset length is acquired, data after the control data of the preset length is prevented from being stored by changing the data received flag, thus it can be ensured that each LED driver only stores its own data, thereby effectively reducing occupation of storage space, and facilitating subsequent control of LEDs according to the stored data.

On the basis of the technical solution provided in the above embodiments, in an embodiment, each LED driver may correspond to a data packet that further includes a preamble code field located before the control data.

When storing the acquired control data, the LED driver may be specifically configured to: detect whether the preamble code field is correct; if the preamble code field is correct, store control data after the preamble code field; if the preamble code field is incorrect, discard the control data after the preamble code field.

Figure 8:
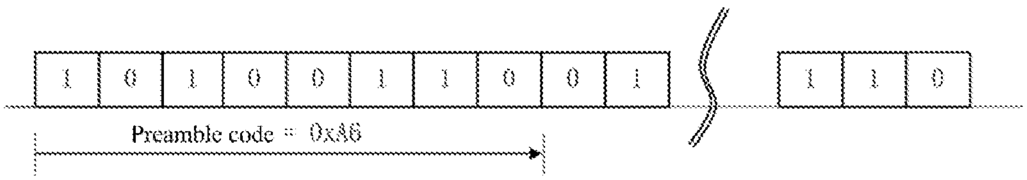
FIG. 8 is a schematic diagram of a preamble code field according to an embodiment of the present disclosure.

FIG. 8 is a schematic diagram of a preamble code field according to an embodiment of the present disclosure. As shown in FIG. 8, the preamble code can be 0xA6, that is, 10100110, or other preset values. Starting to transmit control data after the preamble code field can realize internal pseudo chip enable, and further avoid error-writing by Panel Noise.

In an embodiment, the LED driver is further configured to: if the preamble code field is incorrect, and/or data is not received within a preset time, initialize the LED driver. Here, no reception of data within a preset time may mean that no data is received within a preset time after the preamble code field is acquired, or detection may be performed per preset time. If data is not received, initialization is performed to improve the stability of the LED driver.

On the basis of the technical solution provided in the above embodiments, in an embodiment, the control data in the data packet received by each LED driver is brightness data, which is used for the LED driver to control brightness of an LED connected thereto; or, the control data is command data, which is used to control a state of the LED driver.

In an embodiment, the data packet may further include: an indicator bit set before the control data; the indicator bit is used to indicate whether the control data is brightness data or command data, so as to ensure that the transmitted data is normally used by the LED driver.

Specifically, it can be defined that data packet=preamble code field (8 bits)+indicator bit (1 bit)+brightness data (48 bits)/command data (8 bits)+end bit (1 bit), a total of 58 bits/18 bits.

When the indicator bit is 1, it means that the data packet is command data; when the indicator bit is 0, it means that the data packet is brightness data, and the end bit must be 0 to change the bypass flag. That is, when transmitting command data, the data packet is: 8 bits preamble code field+"0"+8 bits command data+"0". When transmitting brightness data, the data packet is: 8 bits preamble code field+"1"+48 bits brightness data+"0".

The number of bits in each of the above parts can be changed according to the disclosure conditions. For example, 48 bits brightness data can be applied to a case where four LEDs are controlled and each LED corresponds to 12 bits brightness data. If 16 bits brightness data is used to control a single LED, total brightness data in the data packets might reach 64 bits.

In an embodiment, the command data may include at least one of the following:

- a reset command used for setting a bypass flag of each LED driver to the first state value, so that all LED drivers cannot transfer data backward;
- a start command used for setting the bypass flag of each LED driver to a value other than the first state value, so that all LED drivers can transfer data backward;
- a display command used for controlling each LED driver to drive, according to corresponding brightness data, the LED to operate;
- a watchdog control command used for controlling a watchdog of each LED driver. For example, the watchdog control command may specifically be a WatchDog Clear command, so as to clear watchdog count. In addition, the reset command, start command and display command and the like can also clear watchdog count.

The specific value corresponding to each command can be set according to actual needs. Table 2 shows an example of command data according to an embodiment of the present disclosure.

TABLE 2

| Command | Value | Remark |
|---|---|---|
| Reset command RESET(=PowerOnReset) | 0001 | Reset initial 'Pass' mode and clear watchdog count |
| Start command VSTART(=Vsync) | 0010 | Set all 'Mask' mode and clear watchdog count |
| Display command Display On | 0100 | Update the LED data for display and clear watchdog counter |
| WatchDog Clear command WatchDog Clear | 0011 | Reset only watchdog counter |

In an embodiment, the controller may further send the reset command and then the start command before sending the brightness data.

Figure 9:
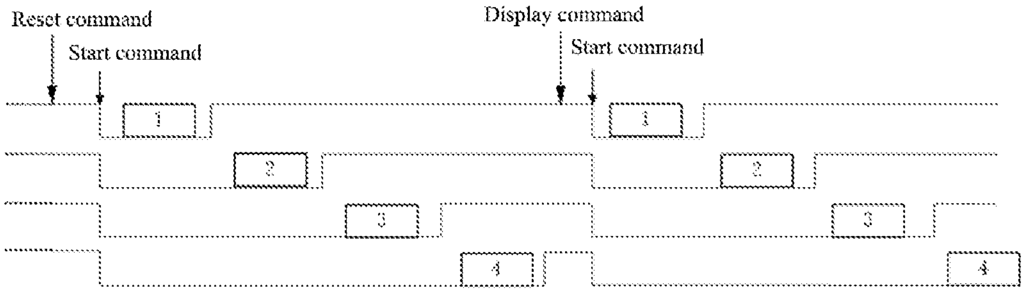
FIG. 9 is a schematic timing diagram of a bypass flag of an LED driver according to an embodiment of the present disclosure.

FIG. 9 is a schematic timing diagram of a bypass flag of an LED driver according to an embodiment of the present disclosure. From top to bottom in FIG. 9 are bypass flags of first to fourth LED drivers respectively. As shown in FIG. 9, after transmission of the reset command, bypass flags of all LED drivers are set to 1, allowing the signal to be transmitted backward. Then, the start command can be sent, and the start command will set the bypass flag of each LED driver to 0, allowing no LED driver to transmit the signal backward.

After the start command, a data packet containing brightness data is sent. A rectangular box in the figure indicates a data packet received by each LED driver when its own bypass flag is 0. The number in the rectangular box indicates the packet number of the data packet among data packets in the data signal sent by the controller.

After the first LED driver acquires corresponding brightness data, the end bit is detected to be 0. At this time, the bypass flag is set to 1, so that the data signal can be transferred to the second LED driver. Similarly, after the second LED driver acquires corresponding brightness data, the end bit is detected to be 0, and the bypass flag is set to 1, so that the data signal can be transferred to the third LED driver. By that analogy, until all LED drivers acquire the brightness data and all bypass flags are set to 1.

After all LED drivers acquire the brightness data, the display of LEDs can be controlled by the LED drivers according to the acquired data through the display command. Similarly, when transmitting the next round of data, a start command can be sent first to set the bypass flag of each LED driver to 0, and all LED drivers are not allowed to transmit backward, and then brightness data can be transmitted.

Figure 10:
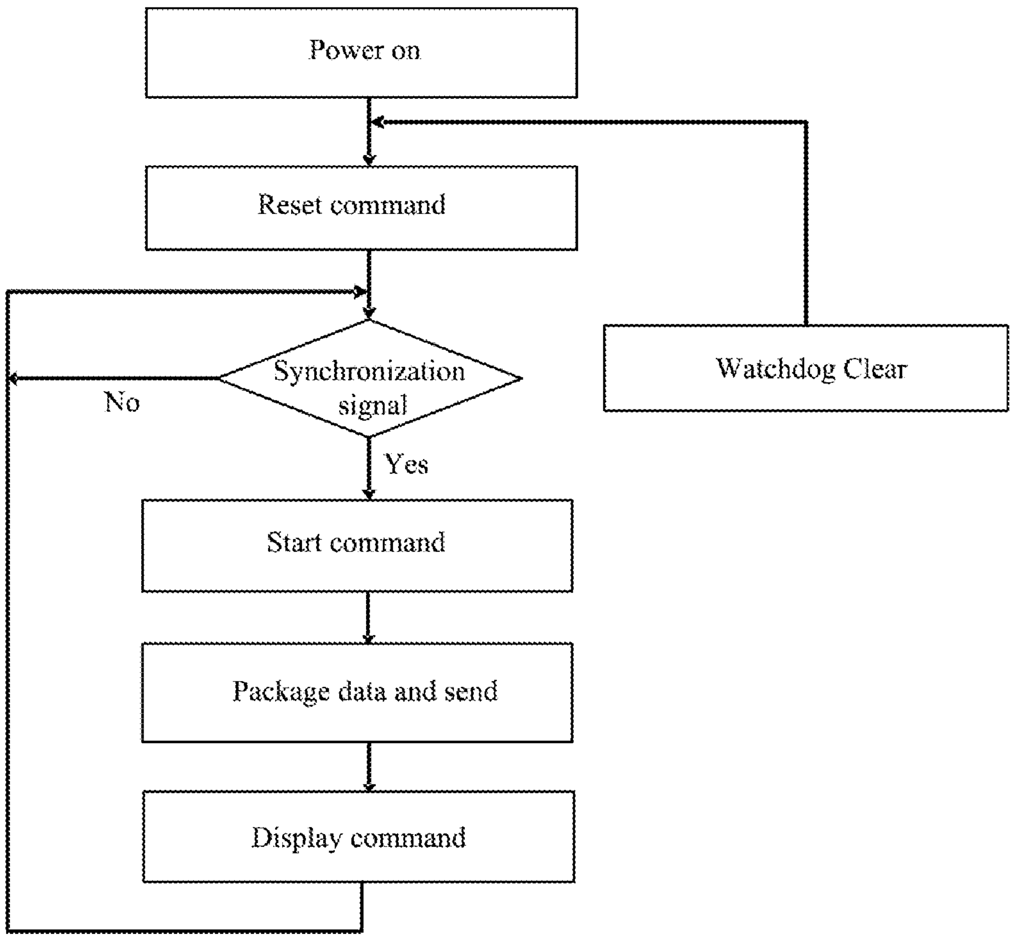
FIG. 10 is a schematic flow chart of controlling an LED according to an embodiment of the present disclosure.

FIG. 10 is a schematic flow chart of controlling an LED according to an embodiment of the present disclosure. As shown in FIG. 10, after power on or when there is a control command of WatchDog Clear, an LED driver can be controlled through a reset command, so that all LED drivers are allowed to transfer backward, and watchdog count is reset.

Then, judge whether a synchronization (Vsync) signal appears. If it does not appear, continue waiting, otherwise send a start command. Here comes a change that all LED drivers are not allowed to transfer backward, and watchdog count is reset. In this way, only the first LED driver can receive data.

Furthermore, the data is packaged and sent to the LED drivers. After the LED drivers successively receive their own corresponding data, here comes a change that they are allowed to transfer backward, and internal update is locked. A plurality of LED drivers receive data one by one until the last LED driver has received the data, and all LED drivers are changed to a mode in which they are allowed to transfer backward. During the whole process, the watchdog count can be cleared after the LED drivers receive command data or brightness data.

Finally, send a display command, enable the LED data for brightness, and continue to wait for the synchronization signal. With the solution shown in FIG. 10, LED control can be achieved effectively.

An embodiment of the present disclosure further provides an electronic device, including the LED control system described in any one of the above embodiments and a plurality of LEDs. The LED control system is configured to control the plurality of LEDs.

In an embodiment, the electronic device can be any device equipped with LEDs, such as an LCD TV, and this is not limited in the embodiment of the present disclosure.

The structure, function, connection relationship and specific implementation principle, process and effect of each component in the electronic device provided in this embodiment can be seen in the above embodiments, and will not be described here.

An embodiment of the present disclosure further provides a data transmission method applied to any LED driver of a plurality of cascaded LED drivers, the LED driver includes a bypass switch, and the method may include: acquiring a data signal from a controller or a previous LED driver, where the data signal includes data packets corresponding to the plurality of LED drivers arranged in sequence, and each LED driver corresponds to a data packet that includes control data and an end bit corresponding to the LED driver; after control data of a preset length is acquired, detecting whether the end bit is a preset value; if the end bit is the preset value and there is a next LED driver, setting a bypass flag to a first state value; where when the bypass flag is the first state value, the bypass switch is turned on to transmit a data signal after the end bit to the next driver; when the bypass flag is not the first state value, the bypass switch is turned off.

An embodiment of the present disclosure further provides an LED driver, including: at least one processor and a memory; where the memory has computer-executable instructions stored therein; the at least one processor executes the computer-executable instructions stored in the memory, to enable the at least one processor to execute the method applied to the LED driver as described above.

An embodiment of the present disclosure further provides a data transmission method applied to a controller. The method includes: determining a data signal corresponding to a plurality of cascaded LED drivers, where the data signal includes data packets corresponding to the plurality of LED drivers arranged in sequence, and each LED driver corresponds to a data packet that includes control data and an end bit corresponding to the LED driver; sending the data signal to the plurality of cascaded LED drivers, to enable the LED driver to acquire control data of a preset length from the controller or a previous LED driver, and detecting whether the end bit is a preset value; if it is detected that the end bit is the preset value and there is a next LED driver, setting a bypass flag to a first state value; where when the bypass flag is the first state value, the bypass switch of the LED driver is turned on to transmit a data signal after the end bit to the next driver; when the bypass flag is not the first state value, the bypass switch is turned off.

An embodiment of the present disclosure further provides a controller, including: at least one processor and a memory; where the memory has computer-executable instructions stored therein; the at least one processor executes the computer-executable instructions stored in the memory, to enable the at least one processor to execute the data transmission method applied to the controller as described above.

In other implementations, the LED driver and/or the controller can also be implemented through hardware circuits.

An embodiment of the present disclosure further provides a computer-readable storage medium in which computer-executable instructions are stored, where when a processor executes the computer-executable instructions, any of the methods described above is implemented.

Specific working principles, processes and effects of the method, LED driver, controller and computer-readable storage medium provided by the embodiments of the present disclosure can be seen in the above embodiments, and will not be repeated here.

In several embodiments provided by the present disclosure, it should be understood that the disclosed device and method can be realized in other ways. For example, the device embodiments described above are only schematic, for example, the division of the parts is only a logical function division, and there can be another division method in actual implementation, for example, a plurality of parts can be combined or integrated into another system, or some features can be ignored or not implemented. On the other hand, the mutual coupling or direct coupling or communication connection shown or discussed can be indirect coupling or communication connection through some interfaces, apparatuses or parts, and can be electrical, mechanical or other forms.

The parts described as separate components may or may not be physically separated, and the components displayed as parts may or may not be physical units, that is, they may be located in one place or distributed to a plurality of network units. Some or all of the parts can be selected according to actual needs to implement the solutions in the embodiments.

In addition, the functional parts in the embodiments of the present disclosure can be integrated in a processing unit, or each part can exist alone physically, or two or more parts can be integrated in a unit. The units formed by the above parts can be realized either in a form of hardware or in a form of hardware and software functional units.

The integrated part implemented in the form of software functional parts can be stored in a computer-readable storage medium. The above software functional module is stored in a storage medium, including several instructions to enable a computer device (which can be a personal computer, a server, or a network device, etc.) or a processor to perform some steps of the method described in various embodiments of the present disclosure.

It should be understood that the above processor can be a central processing unit (CPU), may also be other general-purpose processor, a digital signal processor (DSP), an application specific integrated circuit (ASIC), etc. A general-purpose processor may be a microprocessor or the processor may also be any conventional processor or the like. In combination with the steps of the method disclosed in the disclosure, it can be directly reflected as being executed by the hardware processor, or executed by the combination of hardware and software parts in the processor.

The memory may include a high-speed RAM memory, or a nonvolatile memory NVM, such as at least one disk memory, or a USB flash disk, a mobile hard disk, a read-only memory, a disk or an optical disk.

A bus can be an industry standard architecture (ISA) bus, a peripheral component interconnect (PCI) bus, or an extended industry standard architecture (EISA) bus. The bus may be divided into address bus, data bus, control bus, etc. For the convenience of representation, the bus in the figures of the present disclosure is not limited to only one bus or one type of bus.

The above storage medium can be realized by any type of volatile or nonvolatile storage device or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a disk or an optical disk. The storage medium may be any available medium that can be accessed by a general-purpose or dedicated computer.

An exemplary storage medium is coupled to a processor, so that the processor can read information from the storage medium and write information to the storage medium. Of course, the storage medium can also be a part of the processor. The processor and storage medium can be located in Application Specific Integrated Circuits (ASIC). Of course, the processor and storage medium can also exist in an electronic device or a primary control device as discrete components.

It can be understood by those skilled in the art that: all or part of the steps to implement the above method embodiments can be completed through hardware related to program instructions. The program can be stored in a computer readable storage medium. When the program is executed, the steps including the embodiments of the above methods are executed; the storage medium includes various media in which program codes can be stored, such as a ROM, a RAM, a magnetic disc or an optical disc or the like.

Finally, it should be noted that: the above embodiments are only used to explain the technical solutions of the present disclosure, not to limit it. Although the present disclosure has been described in detail with reference to the above embodiments, those skilled in the art should understand that: they can still modify the technical solutions recorded in the above embodiments, or equivalently replace some or all of the technical features. However, these modifications or substitutions do not make the essence of the corresponding technical solutions deviate from the scope of the technical solutions of the embodiments of the present disclosure.

What is claimed is:

1. A light emitting diode (LED) control system, comprising: a controller and a plurality of cascaded LED drivers;

the controller is configured to: send a data signal to the plurality of cascaded LED drivers, wherein the data signal comprises data packets corresponding to the plurality of LED drivers arranged in sequence, and each LED driver corresponds to a data packet that comprises control data and an end bit corresponding to the LED driver;

the LED driver comprises a bypass switch; the LED driver is configured to: acquire control data of a preset length from the controller or a previous LED driver, and detect whether the end bit is a preset value; if it is detected that the end bit is the preset value and there is a next LED driver, set a bypass flag to a first state value; wherein when the bypass flag is the first state value, the bypass switch is turned on to transmit a data signal after the end bit to the next driver; when the bypass flag is not the first state value, the bypass switch is turned off; wherein the preset value is 0 or 1, and remains unchanged during a data signal transmission process;

wherein each of the data packets corresponding to the plurality of LED drivers arranged in sequence further comprises a preamble code field located before the control data, so that the data packet corresponding to each LED driver comprises the control data corresponding to the LED driver, the preamble code field located before the control data, and the end bit;

when storing the acquired control data, the LED driver is configured to: detect whether the preamble code field is correct; if the preamble code field is correct, store the control data after the preamble code field after detecting that the preamble code field is correct.

2. The system according to claim 1, wherein any two adjacent LED drivers are connected through a single signal line, and a first LED driver of the plurality of cascaded LED drivers is connected with the controller.

3. The system according to claim 1, wherein the LED driver is further configured to:

store the acquired control data;

after the control data of the preset length is acquired, set a data received flag to a second state value to prevent data after the control data of the preset length from being stored.

4. The system according to claim 1, wherein if the preamble code field is incorrect, the LED driver is further configured to discard the control data after the preamble code field.

5. The system according to claim 4, wherein the LED driver is further configured to:

if at least one of the preamble code field is incorrect and data is not received within a preset time, initialize the LED driver.

6. The system according to claim 1, wherein each LED driver is connected with at least one LED;

the control data is brightness data used for the LED driver to control brightness of an LED connected thereto;

or, the control data is command data used for controlling a state of the LED driver.

7. The system according to claim 6, wherein the data packet further comprises: an indicator bit set before the control data;

the indicator bit is used to indicate whether the control data is brightness data or command data.

8. The system according to claim 6, wherein the command data comprises at least one of the following:

a reset command used for setting the bypass flag of each LED driver to the first state value;

a start command used for setting the bypass flag of each LED driver to a value other than the first state value;

a display command used for controlling each LED driver to drive, according to corresponding brightness data, the LED to operate;

a watchdog control command used for controlling a watchdog of each LED driver.

9. The system according to claim 8, wherein the controller is further configured to: send the reset command and then the start command before sending the brightness data.

10. An electronic device, comprising the light emitting diode (LED) control system according to claim 1 and a plurality of LEDs;

wherein the LED control system is configured to control the plurality of LEDs.

11. A data transmission method applied to any light emitting diode (LED) driver of a plurality of cascaded LED drivers, wherein the LED driver comprises a bypass switch, and the method comprises:

acquiring a data signal from a controller or a previous LED driver, wherein the data signal comprises data packets corresponding to the plurality of LED drivers arranged in sequence, and each LED driver corresponds to a data packet that comprises control data and an end bit corresponding to the LED driver;

after control data of a preset length is acquired, detecting whether the end bit is a preset value;

if the end bit is the preset value and there is a next LED driver, setting a bypass flag to a first state value; wherein when the bypass flag is the first state value, the bypass switch is turned on to transmit a data signal after the end bit to the next driver; when the bypass flag is not the first state value, the bypass switch is turned off; wherein the preset value is 0 or 1, and remains unchanged during a data signal transmission process;

wherein each of the data packets corresponding to the plurality of LED drivers arranged in sequence further comprises a preamble code field located before the control data, so that the data packet corresponding to each LED driver comprises the control data corresponding to the LED driver, the preamble code field located before the control data, and the end bit; and the method further comprises:

when storing the acquired control data, detecting whether the preamble code field is correct; if the preamble code field is correct, storing the control data after the preamble code field after detecting that the preamble code field is correct.

12. The method according to claim 11, wherein any two adjacent LED drivers are connected through a single signal line, and a first LED driver of the plurality of cascaded LED drivers is connected with the controller.

13. The method according to claim 11, further comprising:

storing the acquired control data;

after the control data of the preset length is acquired, setting a data received flag to a second state value to prevent data after the control data of the preset length from being stored.

14. The method according to claim 11, wherein the method further comprises:

if the preamble code field is incorrect, discarding the control data after the preamble code field.

15. The method according to claim 14, further comprising:

if at least one of the preamble code field is incorrect and data is not received within a preset time, initializing the LED driver.

16. A data transmission method, applied to a controller, comprising:

determining a data signal corresponding to a plurality of cascaded light emitting diode (LED) drivers, wherein the data signal comprises data packets corresponding to the plurality of LED drivers arranged in sequence, and each LED driver corresponds to a data packet that comprises control data and an end bit corresponding to the LED driver;

sending the data signal to the plurality of cascaded LED drivers, to enable the LED driver to acquire control data of a preset length from the controller or a previous LED driver, and detecting whether the end bit is a preset value; if it is detected that the end bit is the preset value and there is a next LED driver, setting a bypass flag to a first state value; wherein when the bypass flag is the first state value, the bypass switch of the LED driver is turned on to transmit a data signal after the end bit to the next driver; when the bypass flag is not the first state value, the bypass switch is turned off; wherein the preset value is 0 or 1, and remains unchanged during a data signal transmission process;

wherein each of the data packets corresponding to the plurality of LED drivers arranged in sequence further comprises a preamble code field located before the control data, so that the data packet corresponding to each LED driver comprises the control data corresponding to the LED driver, the preamble code field located before the control data, and the end bit; and the method further comprises:

when storing the acquired control data, detecting whether the preamble code field is correct; if the preamble code field is correct, storing the control data after the preamble code field after detecting that the preamble code field is correct.

17. A light emitting diode (LED) driver, comprising at least one processor and a memory;

wherein the memory has computer-executable instructions stored therein;

the at least one processor executes the computer-executable instructions stored in the memory, to enable the at least one processor to execute the method described in claim 11.

18. A controller, comprising: at least one processor and a memory;

wherein the memory has computer-executable instructions stored therein;

the at least one processor executes the computer-executable instructions stored in the memory, to enable the at least one processor to execute the method described in claim 16.

19. A non-transitory computer-readable storage medium in which computer-executable instructions are stored, wherein when a processor executes the computer-executable instructions, the method described in claim 11 is implemented.

20. A non-transitory computer-readable storage medium in which computer-executable instructions are stored, wherein when a processor executes the computer-executable instructions, the method described in claim 16 is implemented.

* * * * *